US009062729B2

(12) United States Patent
Chelaidite (10) Patent No.: US 9,062,729 B2
(45) Date of Patent: Jun. 23, 2015

(54) BRAKE PAD COUPLER (71) Applicant: Akebono Brake Corporation, Farmington Hills, MI (US)

(72) Inventor: Galus Chelaidite, South Lyon, MI (US)

(73) Assignee: AKEBONO BRAKE CORPORATION, Farmington Hills, MI (US)

( * ) Notice: Subject to any disclaimer, the term of this patent is extended or adjusted under 35 U.S.C. 154(b) by 203 days.

(21) Appl. No.: 13/669,828

(22) Filed: Nov. 6, 2012

(65) Prior Publication Data

US 2014/0124306 A1    May 8, 2014

(51) Int. Cl.
*F16D 65/097* (2006.01)
*F16D 65/092* (2006.01)
*F16D 55/226* (2006.01)

(52) U.S. Cl.
CPC .......... *F16D 65/092* (2013.01); *F16D 55/2262* (2013.01); *F16D 65/0972* (2013.01); *F16D 65/0975* (2013.01); *F16D 65/0977* (2013.01)

(58) Field of Classification Search
CPC . F16D 55/225; F16D 55/2262; F16D 65/092; F16D 65/0977
USPC ............. 188/18 A, 72.3, 73.31, 73.37, 73.38, 188/205 A, 216
See application file for complete search history.

(56) References Cited

U.S. PATENT DOCUMENTS

| | | | |
|---|---|---|---|
| 5,687,817 A * | 11/1997 | Kobayashi et al. | 188/72.3 |
| 5,699,882 A | 12/1997 | Ikegami et al. | |
| 5,941,348 A | 8/1999 | Matsumoto et al. | |
| 5,947,233 A | 9/1999 | Kobayashi et al. | |
| 6,003,642 A | 12/1999 | Mori et al. | |
| 6,234,284 B1 | 5/2001 | Ashman et al. | |
| 6,478,122 B1 | 11/2002 | Demoise, Jr. et al. | |
| 6,607,252 B2 | 8/2003 | Weng et al. | |
| D483,709 S | 12/2003 | Byrd et al. | |
| D489,655 S | 5/2004 | Byrd et al. | |
| 7,219,773 B2 * | 5/2007 | Ono | 188/73.38 |
| 7,513,340 B2 | 4/2009 | Hendrich et al. | |
| 7,695,075 B1 | 4/2010 | Mackiewicz | |
| 8,020,674 B2 * | 9/2011 | Miura et al. | 188/73.38 |
| 8,397,880 B2 | 3/2013 | Chelaidite | |
| 2002/0189911 A1 | 12/2002 | Layton et al. | |
| 2005/0274579 A1 * | 12/2005 | Nogiwa | 188/73.38 |
| 2009/0101456 A1 | 4/2009 | Layton | |
| 2010/0051393 A1 * | 3/2010 | Arioka | 188/72.3 |
| 2011/0168503 A1 * | 7/2011 | Chelaidite | 188/73.31 |

FOREIGN PATENT DOCUMENTS

| | | |
|---|---|---|
| EP | 2299142 A1 | 2/2011 |
| GB | 2172068 A | 8/1986 |
| JP | 2001-336554 A | 12/2001 |

* cited by examiner

*Primary Examiner* — Thomas Irvin
(74) *Attorney, Agent, or Firm* — The Dobrusin Law Firm, P.C.

(57) ABSTRACT

A device comprising one or more movable links adjacent to and spanning between two opposing brake pads along an axis, wherein the one or more movable links connect the two opposing brake pads so that the brake pads remain in a substantially parallel relationship as the two opposing brake pads move relative to each other along the axis when contacted by a rotor during a free running condition, and wherein dimensions of the one or more movable links remain constant during a brake apply, a brake retract, the free running condition, or a time therebetween.

20 Claims, 7 Drawing Sheets

BRAKE PAD COUPLER

FIELD

The present teachings generally relate to a device for minimizing disc thickness variation, brake torque variation, or both.

BACKGROUND

The present teachings are predicated upon providing an improved disc brake system for use with vehicles. For example, the disc brake system may be used with almost any vehicle (e.g. car, truck, bus, train, airplane, or the like). Alternatively, the disc brake system may be integrated into assemblies used for manufacturing or other equipment that require a brake such as a lathe, winder for paper products or cloth, amusement park rides, wind turbines, the like, or a combination thereof. However, the present teachings are most suitable for use with a passenger vehicle (i.e. a car, truck, sports utility vehicle, or the like).

Generally, a braking system includes a rotor, a caliper body, a support bracket, an inboard brake pad, and an outboard brake pad located on opposing sides of the rotor. The caliper body further includes a bridge, one or more fingers, and a piston bore. The piston bore houses a piston. The bore has a bore axis that the piston moves along during a brake apply and a brake release. The piston bore may include a fluid inlet, a closed wall, a front opening, and a cylindrical side wall that has a seal groove located near the front opening. Typically, the fluid inlet is located in the closed wall of the piston bore so that when pressure is applied the fluid will flow into the piston bore. During a pressure apply the fluid will push the piston towards the front opening and into contact with a brake pad and then the brake pad into contact with a rotor. The caliper housing moves so that the one or more fingers contact the opposing brake pad and then move the opposing brake pad into contact with the opposing side of the rotor. After a brake release, the brake pads generally move independently of each other, and the brake pads intermittently and randomly contact the rotor resulting in the brake pads, the opposing faces of the rotor, or both possibly being worn unevenly. The uneven wear of the brake pads and/or rotor may be caused during a brake apply, but it is believed that most of the uneven wear of the brake pads, the rotor, or both is caused by the brake pads contacting the rotor during free running; thus, exacerbating any existing disc thickness variation. Any disc thickness variation between the two faces of the rotor, any wobble of the rotor, also called lateral runout (LRO), and any variation on a face of a brake pad, or a combination thereof may continue to increase through use, possibly causing sufficient disc thickness variation (DTV), sufficient brake torque variation (BTV), or both that the operator feels pulsation in the suspension, steering wheel pulsation, brake pedal pulsation, or a combination thereof. If DTV and BTV become severe enough, vibrations may be felt during driving and/or braking so that the vehicle vibrates, which may result in damage to other vehicle components and/or complaints by the vehicle owner. Examples of attempts to control DTV, BTV, or both may be found in U.S. Pat. Nos. 6,234,284; 6,478,122; 6,607,252; and 7,695,075 and U.S. Patent Application Publication Nos. 2002/0169911 and 2009/0101450 all of which are incorporated by reference herein for all purposes. However, some of these systems are very expensive and/or require complex control systems and strategies; thus, it may not be cost effective to implement these systems in existing cars or lower cost cars.

It would be attractive to have a device and/or method that prevents and/or minimizes DTV, BTV, or both over the life of the brake pads, the rotor, or both so that the operator, during braking, does not experience pulsation of the suspension, steering wheel, brake pedal, or a combination thereof. It would be attractive to have a device that extends the life of the brake pads, rotor, or both by maintaining the faces of each respective component in a substantially parallel configuration during a brake-off condition (i.e., running). It would further be attractive to have a system where a rotor does not require replacement at the same time as replacement of the brake pads because DTV of the rotor is minimized during the life of the rotor. What is needed is a device that maintains both brake pads in a parallel relationship and assists in wearing both faces of a rotor, both faces of both brake pads, or both in an equal manner so that the faces of the, rotor and/or brake pads do not vary.

SUMMARY

The present teachings meet one or more of the present needs by providing: a device comprising: one or more movable links adjacent to and spanning between two opposing brake pads along an axis, wherein the one or more movable links connect the two opposing brake pads so that the brake pads remain in a substantially parallel relationship as the two opposing brake pads move relative to each other along the axis when contacted by a rotor during a running condition, and wherein dimensions of the one or more movable links remain constant during a brake apply, a brake retract, the running condition, or a time therebetween.

One possible embodiment of the present teachings include: a brake system, comprising: a rotor; an inboard brake pad on an inboard side of the rotor; an outboard brake pad on an outboard side of the rotor; a leading link spanning between a forward region of the outboard brake pad and a forward region of the inboard brake pad; and a trailing link spanning between a rearward region of the outboard brake pad and a rearward region of the inboard brake pad; wherein the leading link and the trailing link are attached by a movable attachment to the inboard brake pad, the outboard brake pad, or both; wherein the movable attachment holds the leading link and the trailing link with a friction force so that during a free running condition a face of the inboard brake pad and a face of the outboard brake pad are maintained in a substantially parallel relationship along the rotor faces. During a brake apply, the braking force applied to the two opposing, brake pads is sufficient to overcome the friction force so that the two opposing brake pads move independent of each other, and wherein dimensions of the leading link, the trailing link, or both remain constant during a brake apply. For example, the stiffness of the link substantially maintains the length and/or shape of the leading link, the trailing link, or both during a brake apply, a brake retract, free running, or a time therebetween.

The teachings herein solve one or more of these problems by providing a device and/or method that prevents and/or minimizes DTV, BTV, or both over the life of the brake pads, the rotor, or both so that the operator does not experience pulsation propagating through the suspension, steering wheel, brake pedal, or a combination thereof. The teachings provide a device that extends the life of the brake pads, rotor, or both by maintaining the faces of each respective component in a substantially parallel configuration during a brake-off condition (i.e., running). The teachings herein provide a device that minimizes wear to a rotor so that the rotor that does not require replacement at the same time as replacement of the brake pads because DTV of the rotor is minimized during the life of the rotor. The teachings provide a device that maintains both brake pads in a parallel relationship and assists in wearing both faces of a rotor, both faces of both brake pads, or both in an equal manner so that the faces of the rotor and/or brake pads do not vary.

DETAILED DESCRIPTION

The explanations end illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Generally, a brake system comprises: a rotor; an inboard brake pad on an inboard side of the rotor; an outboard brake pad on an outboard side of the rotor; a caliper extending over the brake pads and the rotor, and a support bracket attaching the caliper, brake pads, rotor, or a combination thereof to a knuckle of a vehicle. The brake pads generally include a friction material and a pressure plate. During a brake apply a piston and/or fingers of the caliper push against a pressure plate of a brake pad so that the friction material contacts the rotor. The brake pads may be located in the brake system so that the brake pads are generally independent of each other. Preferably, the brake pads as taught herein are connected together so that the brake pads move substantially in unison during free running. The brake pads may be connected or coupled together using one or more movable links that attach to and span between the brake pads. These movable links may be located and/or shaped in such a way that the movable links may not interfere with the rotor (e.g., contact the rotor).

The one or more movable links may be any device that attaches to both brake pads so that the brake pads move substantially in unison during free running. Preferably, the one or more movable links may be a device that attaches to and/or contacts both brake pads so that movement of a brake pad due to an external force, other than a piston during a brake apply, moves the one or more movable links and the brake pads substantially in unison. For example, during free running, the rotor may contact one of the brake pads forcing the brake pad to move with the rotor in the axial direction, relative to the rotor, a wheel, or both, while the movable link may move the opposing brake pad towards the rotor accordingly, in unison with the brake pad that is in contact with the rotor. The one or more movable links may attach to any portion of the brake pads and/or in any manner so that the movable links enable one or all of the following cases to occur coupling or connecting the brake pads to each other, maintaining the brake pads in a substantially parallel relationship with each other, maintaining a constant distance between the brake pads during free running and forcing the brake pads to move in a substantially synchronized manner when either of the pads is in contact with the rotor. The one or more movable links may be located in any location that allows the movable links and brake pads to function as described herein. The one or more movable links may extent over the rotor, around the rotor, or both to attach the brake pads together. Preferably, the one or more movable links maintain the faces of the opposing brake pads substantially parallel to each other and to the two faces of the rotor so that during a brake apply, a brake release, free running, or a time therebetween the opposing brake pads contact a rotor equally on both sides of the rotor, maintain a planar relationship with each other during contact with the rotor, maintain a substantially planar relationship with both faces of the rotor, or a combination thereof. The brake system may include one large movable link in central region of the brake pad. Preferably, the brake system includes at least two movable links. The brake system may include a trailing link in a trailing region, of a brake pad and a leading link in a leading region of the brake pad forward of the trailing link in the direction of rotation of a rotor. A leading link is located forward of a trailing link in a direction of rotation of the rotor. For example, a point on the rotor would pass the leading link first and then the trailing link as the point rotates with the rotor. The movable links may be located in a leading region, a central region, a trailing region, or a combination thereof of the brake pads. Preferably, the one or more movable links are attached to the brake pads so that movement of one brake pad forces a similar movement of the opposing brake pad during free running.

The brake pads may be movable towards each other if a sufficient force is applied to the brake pads that will overcome the friction force of the movable links holding the brake pads (i.e., the link force). For example, during a brake apply the piston creates a sufficient force and moves the inboard brake pad into contact with the rotor, while the movable link pushes the outboard brake pad away from the rotor until the outboard brake pad contacts the fingers of the caliper which move the outboard brake pad into contact with an opposing side of the rotor due to the forces exerted on the brake pads being sufficient to overcome the friction force of the movable link such that any air gap is reduced and/or eliminated and the distance between the brake pads is reduced. The movable links may be free of assistance in creating an air gap after a brake apply. For example, the movable links may not store energy during a brake apply and/or not release energy during a brake release so that the movable links do not assist in retracting the brake pads away from the rotor faces. Stated another way, the movable links may be free of any stored energy created when the brake pads are moved during a brake apply, thus, the movable links may be free of an energy release during a brake release so that the brake pads are free of movement away from the rotor. The friction force on the links may reduce and/or eliminate movement of the brake pads after a brake apply, leaving no air gap between the brake pads and the rotor. For example, the links may maintain the position of the brake pads relative to each other and upon a first full revolution of the rotor, an air gap is generated by a prying force created when the thickest part of the rotor passes through the pads, forcing the pads apart (i.e., one or both pads and the movable links slip with respect to each other, creating the air gap). In another example, the friction force (i.e., link force) of the movable link may prevent the brake pads from retracting as far when compared to brake pads that do not include movable links. The friction material, the pressure plate, or both, after a brake apply, may re-expand to a pre-brake apply thickness moving the pressure plates away from the rotor and overcoming the friction force (i.e., the link force) of the movable link, thus, increasing the distance between the pressure plates of the opposing brake pads. The brake pads, after a brake apply, may remain substantially in the same plane as during a brake apply until a force acts upon the brake pads moving the brake pads out of the plane such as rotor variation. Rotor variation may act upon the brake pads so that the brake pads are moved apart relative to each other. Rotor variation may be a high spot on the rotor, rotor wobble, any part of the rotor that causes the rotor to extend out of the rotational plane of the rotor, or combination thereof. The brake pads, after a brake apply, may be moved away from the creating an air gap, by rotor variation (e.g., a high spot on the rotor, rotor wobble, or both).

In one non-limiting example, the brake pads, after a brake apply, may remain in a close proximity and/or in contact with the rotor so that when the rotor begins to rotate again, a high spot on the rotor may pry the brake pads away to allow passage of the high spot on rotor. The brake pads, through the one or more movable links, will maintain the brake pad in contact with any rotor variation (e.g., the high spot in the rotor, any rotor wobble, or both) so that the rotor is worn evenly at this location and DVT, BTV, or both are substantially reduced. The high spot, and to a lesser extent rotor wobble, or both will generate enough force to overcome the friction force (i.e., link force) of the movable link so that the distance between the two faces of the brake pads are equal to the rotor variation (e.g., the highest high spot on the rotor, the maximum rotor wobble, or both) and an air gap is created between all or a portion of the brake pads and the rotor.

The link force may be any force that is sufficient to connect the movable link to the brake pads so that during a brake-off and/or free running the force of the rotor against one or both of the brake pads is insufficient to overcome the link force and move the brake pads relative to each other. Preferably, the link force is sufficient so that the brake pads move in unison when one or both of the brake pads contact the rotor during free running, other than during a first rotation of the rotor where the rotor variation may move the brake pads to create an air gap. The link force may be sufficient so that the links move relative to an attachment feature before the brake pads move relative to each other. Stated another way, the link force may be greater than the holding force so that during contact with a rotor the holding force is overcome first and the brake pads move in unison with each other before the link force is overcome and the brake pads move relative to each other. The force required to overcome the friction force of the link force and move the one or more movable links such as the leading link, the trailing link, or both along; through, on or a combination thereof the attachment may be about 5 N or more, about 10 N or more, about 15 N or more, about 20 N or more, or even about 25 N or more. The force required to overcome the link force to move one or more movable links such as the leading link, the trailing link, or both, along, through, on, or a combination thereof the attachment may be about 40 N or less, about 35 N or less, or about 30 N or less. The force required to overcome the link force and move the trailing link, the leading link, or both along, through, on, or a combination thereof the attachment may be from about 1 N to about 40 N, preferably from about 3 N to about 30N, or more preferably from about 5 N to about 25 N during a brake apply, a brake retract, free running, or any time therebetween. Preferably, the link force is substantially greater than the holding force. The link force may be greater than the holding force by a factor of about 5 or more, about 10 or more, about 15 or more, or even about 25 or more.

The holding force of the one or more movable links may be any force so that the one or more movable links move the brake pads together (i.e., in unison or synchronized) during free running. The holding force may be any force that connects the one or more links to an attachment feature. The holding force of the one or more movable links may be any force so that the one or more movable links are moved during a brake apply. The holding force of the one or more movable links may be sufficient so that the movable links move on and/or along the attachment feature and move the brake pads in unison during normal free running conditions and maintain the distance between the two opposing brake pads. The force required to overcome the holding force and move the one or more movable links such as the leading link, the trailing link, or both along the attachment feature may be any force so that the movable links may move along the attachment feature when the brake pads are contacted by the rotor during free running so that the faces of the opposing brake pads are maintained in a parallel relationship. The holding force may be a sufficient force so that the link is connected to one or both brake pads, the support bracket, or both, but the holding force may be low enough so that the holding force is overcome and the two opposing brake pads move in unison. The holding force may be the amount of force required to move the one or more movable links along an axis, along an axis parallel to the rotational axis of the rotor, a wheel, or both while maintaining the distance between the two opposing brake pads. For example, the holding force may maintain contact with an attachment feature (e.g., the brake pads, the support bracket, the support bracket abutment, or a combination thereof) but may allow the one or more movable links to move and/or slide along an attachment feature (e.g., the brake pad, support bracket, support bracket abutment, or a combination thereof) so that the brake pads move when contacted by the rotor and maintain their spatial relationship relative to each other. The holding force may be any force that is less than a link force as discussed herein. For example, during contact between one or both of the brake pads and a rotor may cause the link to move along the attachment feature before the brake pads move relative to the movable links.

The force required to overcome the holding force and move the one or more movable links such as the leading link, the trailing link, or both along, through, on, or a combination thereof the attachment feature may be about 10 N or less, about 8 N or less, preferably about 5 N or less, more preferably about 2 N or less, or even more preferably about 1 N or less. The force required overcome the holding force and to move the one or more movable links such as the leading link, the trailing link, or both, along, through, on, or a combination thereof the attachment feature may be more than about 0 N, about 0.1 N or more, or about 0.5 N or more. The force required to overcome the holding force and move the trailing link, the leading link, or both along, through, on, or a combination thereof the attachment feature may be from about 0 N to about 10 N, preferably from about 0.2 N to about 5N, or more preferably from about 0.5 N to about 2 N during a brake apply, a brake retract, free running, or any time therebetween. Stated another way the amount of force required to move both brake pads in unison along the attachment feature via the movable link may be more than, about 0 N, about 0.1 N or more, or about 0.3 N or more per connection to a movable link. The amount of force required to move both brake pads in unison along the attachment feature via the movable link may be about 10 N or less, about 7 N or less, or about 3 N or less.

The one or more movable links may be attached to the friction material, the pressure plate, or both. Preferably, the movable links are attached to and/or an integral part of a pressure plate. The one or more movable links may be attached to the opposing brake pads in any manner, at any location, or both so that the movable links when attached maintain the face of each of the two opposing brake pads in a substantially parallel manner. Preferably, the movable links may be attached to the opposing brakes pads in any location, manner, or both so that disc thickness variation, brake torque variation, or both are maintained, prevented, substantially reduced, eliminated, or a combination thereof. The one or more movable links may maintain the face of each of the opposing brake pads so that the faces are substantially parallel in a lateral direction, a radial direction, a longitudinal direction, or a combination thereof. Preferably, the one or more movable links may be attached to a top of the pressure plate, an end of the pressure plate, or both. The one or more movable links may be movably attached to both brake pads so that both brake pads may move relative to the one or more movable links. Preferably, one end of the one or more movable links are fixedly attached to one brake pad and the opposing ends are movably attached to the opposing brake pad so that a distance between the two opposing brake pads may vary. However, both ends of the two or more movable links may be movably attached to the two or more opposing brake pads. The one or more movable links may be fixedly attached to an inboard brake pad, an outboard brake pad, or both. The one or more movable links may be movably attached to an inboard brake pad, an outboard brake pad, or both. The one or more movable links may be fixedly attached to an outboard brake pad and movably attached to an inboard brake pad or vice versa. The one or more movable links may be fixedly attached by any fixed attachment device so that a permanent connection is formed between the one or more movable links and at least one brake pad. The fixed attachment device may be any attachment device that allows the system to function as recited herein, for example, a weld, glue, bonding, a fastener, a friction fit, a mechanical interlock, an integral part of the brake pad, a spring force, or a combination thereof. For example, a fastener may be welded, glued, bonded, or a combination thereof to the brake pad and then the fastener may securely hold the movable link to the brake pad. The movable attachment device may be any device so that the movable link is movably attached to at least one brake pad and the brake pad may move relative to an opposing brake pad. The movable attachment device may be a fastener, a mechanical hold, a friction fit, a press fit, a tongue and groove arrangement, or a combination thereof. The movable attachment device may be a link spring.

The link spring may be any device that creates a force on the brake pads. The link springs may create a force on the brake pads in any way so that the link spring creates a link force. The link spring may be movable so that a portion of one or more brake pads may be attached to the movable link. The link spring may create any force discussed herein for the link force.

The movable links may be any configuration so that the movable links connect two opposing brake pads together. The movable links may have some flexibility. Preferably, the movable links are rigid. More preferably, the movable links may be rigid enough so that the movable links may maintain their dimensions (e.g., length, width, height, orientation, or a combination thereof) during a brake apply without deflecting. Most preferably, the movable links may be rigid enough so that the movable links may withstand a brake apply and overcome a friction force of the movable link so that the brake pads slide along the movable links and the movable, links maintain their dimensions. The movable links may be any size, shape, material, or a combination thereof so that the movable links maintain their size and shape during a brake apply and maintain the brake pads substantially parallel. The movable links may be cylindrically shaped. The movable links may be substantially flat and planar and include one or more curved edges, one or more breaks, one or more folds, or a combination thereof that may extend out of plane. The entire movable link may be planar. The movable links may be rigid along the rotational axis of the rotor. The movable links may be flexible along the length of the pressure plate (i.e., in a direction perpendicular to the rotational axis). The movable links may be made of a cylindrical material, a square material, an oval material, a unitary sheet of material, or a combination thereof. The movable links may be made of a rigid polymer, metal, or both. Preferably, the movable links may be made of stainless steel.

The one or more movable links may be oriented so that the largest dimension spans between the opposing brake pads and is parallel to the rotational axis of the rotor. The one or more movable links may be oriented so that the largest dimension spans along the length of the brake pads (i.e., perpendicular to the rotational axis). The one or more movable links may have a forward end region, a rearward end region, a central region, or a combination thereof when viewed in a cross-section. The forward end region, the rearward end region, the central region, or a combination thereof may include a bend, a fold, a crease, a break, an attachment portion, or a combination thereof. Preferably, the forward end region and the rearward end region include an attachment portion that may be a fold, a bend, or any other configuration so that the movable links may be movably attached, fixedly attached, or both to the opposing brake pads. The forward end region and the rearward end region may be coplanar with each other and the central region. The forward end region and the rearward end region may be substantially coplanar with each other and may extend out of the plane of the central region. The central region may include one or more breaks, one or more bends, one or more folds, or a combination thereof. The one or more breaks, one or more bends, one or more folds, or a combination thereof may provide the movable links with some flexibility along the length of the brake pads so that the movable links may be compressed and fitted into holders on the brake pads. The one or more breaks, one or more bends, one or more folds, or a combination thereof may strengthen, bolster rigidity, or both the movable link in a direction parallel to the rotational axis of the rotor, perpendicular to the rotational axis of the rotor, or both so that the size and shape of the movable links remain constant. The one or more breaks, one or more bends, one or more folds, or a combination thereof may attach the one or more movable links to an ear of the two or more opposing brake pads, to a support bracket, to a support bracket abutment, or a combination thereof. The breaks, bends, folds, or a combination thereof may create a link force on a portion of the two opposing brake pads so that the two opposing brake pads are connected to the movable link. Preferably, the breaks, bends, folds, or a combination thereof secure the movable link to an ear of the two opposing brake pads so that the movable link holds a portion of the brake pad such as the ear with a link force. The link force may be created at any location along the brake pad so that the link and the two opposing brake pads move in unison during an external force, other than a piston during a brake apply. Preferably, the link force is created on the ears of the brake pads so that the ears of the brake pads are secured by the link during free running.

The movable links may be free of springing ability in a direction of movement of the two opposing brake pads parallel to the rotational axis of the rotor and/or the wheel). For example, the length of the movable links may remain substantially constant as the brake pads move during a brake apply so that the brake pads slide relative to the movable links once the friction force is overcome at the movable attachment. The movable links may be free of any force that moves the brake pads. The movable links may not store energy that after a brake apply the movable links do not assist in moving the brake pads (i.e., the movable links do not assist in creating an air gap). The movable links during free running may be substantially free of independent movement increasing the distance between the opposing brake pads.

The movable links and brake pads may form a parallelogram, when viewed from above and/or when viewed from an end of the brake pads, during a brake apply, a brake retract, free running, or any time therebetween. The movable links and brake pads may move in unison during free running so that when one brake pad is moved the opposing brake pad moves. During free running the distance between the opposing brake pads may remain substantially constant. During free running the distance between the opposing brake pads may be affected by rotor variation (e.g., rotor wobble, high thickness of the rotor, or both). During free running a force to a brake pad may not be sufficient to increase the distance between the two opposing brake pads, except for when the rotor initially begins to rotate again after a brake apply forcing the brake pads apart.

The entire movable link it may extend over the rotor, a portion of the movable link may extend over the rotor, the entire movable link, may extend around the rotor, or a combination thereof. A movable link having a portion that does not extend over the rotor (i.e., a portion of the movable link is along a face of a rotor) may include one or more locators that prevent movement of the movable links into the rotor. The locators may prevent movement of the movable link by contacting a brake pad, the support bracket, an abutment, an attachment feature, or a combination thereof. The locators may be located at the ends of the movable link so that the locators extend around an external portion of a support bracket, a brake pad, an attachment feature, or a combination thereof (i.e., an external locator). The locators may be located in a central region of the movable link so that the locators extend around and/or within an internal portion of the support bracket, a brake pad, attachment feature, or a combination thereof (i.e., internal locator). The locators may be located substantially in contact with the brake pad, the support bracket, attachment feature, or a combination thereof so that movement of the movable link is minimized. Preferably, the locators are located a sufficient distance from the brake pads, the support bracket, attachment feature, or a combination thereof so that the movable links move the two opposing brake pads in unison without the locators limiting the movement of the movable link with the brake pads. More preferably, the locators are located a sufficient distance from the brake pads, the support bracket, the attachment feature, or a combination thereof so that the movable links move with the brake pads but the locators prevent the movable links from contacting the rotor. The locators may be located about 0.5 mm or less, about 0.4 mm or less, about 0.3 mm or less, or about 0.2 mm or less from the support bracket, the brake pad, an attachment feature, or a combination thereof. The locators may be located 0.001 mm or more, about 0.01 mm or more, about 0.05 mm or more, or about 0.1 mm or more from the support bracket, a brake pad, an attachment feature, or a combination thereof. Thus, for example, if the locator is located above 0.2 mm from an attachment feature the movable link may only move 0.2 mm in the axial direction of the rotor or the wheel. Preferably, the movable links include on an internal locator on each side of the rotor that limits movement of the movable link.

The movable links may include one or more guides. The guides may be any device that assists in attaching the movable links to a brake pad, a support bracket, an attachment feature, or a combination thereof. The guides may assist in locating the movable link so that the link and the brake pads, the support bracket, or both are properly oriented. The guides may assist the movable links from expanding so that a brake pad, a portion of the support bracket, an attachment feature, or a combination thereof may be snapped into the movable link. For example, the guide may assist is spreading to opposing parts of the movable link apart so that the a holding force, a link force, or both is created.

Figure 1:
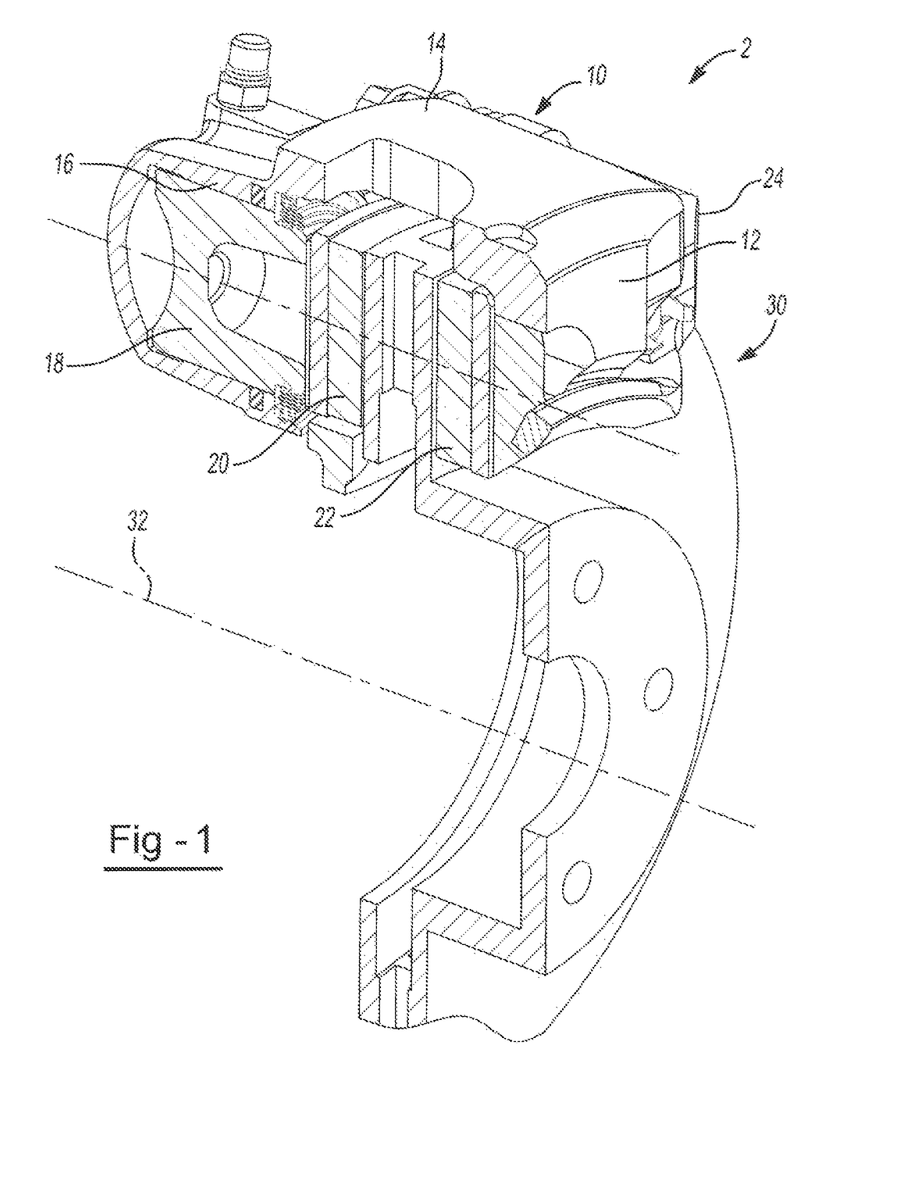
FIG. 1 illustrates a cross-sectional view of one ore possible disc brake system.

FIG. 1 illustrates a cross-sectional view of a brake system 2. The brake system 2 includes a caliper 10, a support bracket 24, and a rotor 30. The caliper 10 includes fingers 12, a piston bore 16, and a bridge 14 connecting the fingers 12 and the piston bore 18. A piston 18 is housed in the piston bore 16. An inboard brake pad 20 and an outboard brake pad 22 are located in the caliper 10 on opposing sides of the rotor 30 so that during a brake apply the inboard brake pad 20 and the outboard brake pad 22 are moved into contact with the rotor 30 and a braking force is created. The rotor 30 includes an axis of rotation 32.

Figures 2A, 2B:
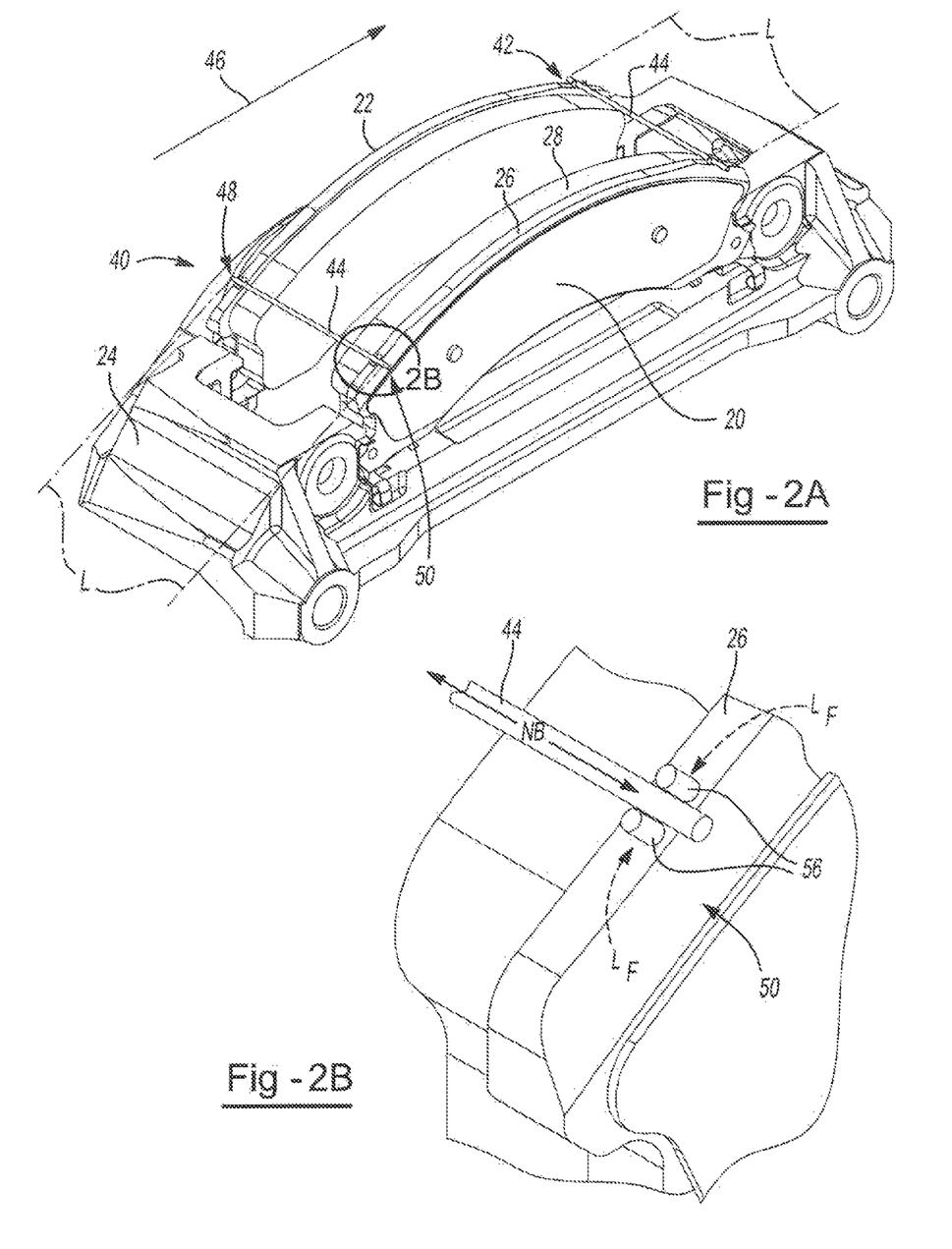
FIG. 2A illustrates an example a brake system including movable links of the teachings herein.
FIG. 2B is a close-up view of the movable link of FIG. 2A.

FIG. 2A illustrates a perspective view of a support bracket 24, an inboard brake pad 20, an outboard brake pad 22, and the direction of rotation 46 of the rotor 30 (not shown). The direction of rotation 46 of the rotor defines the leading region 40 and the trailing region 42. The inboard brake pad 20 and the outboard brake pad 22 are coupled together via one possible design of movable link 44 of the teachings herein. FIG. 2A has a movable link 44 in the leading region 40 and a movable link 44 in the trailing region 42. The movable links 44 form a fixed attachment 48 with a pressure plate 26 of the outboard brake pad 22, extend over the rotor (not shown) and the friction material 28 of the respective brake pads, and form a movable attachment 50 with a pressure plate 26 of the inboard brake pad 20. The movable link 44 has a length (L) measured from an end of the movable link on the outboard side to an end of the movable link on the inboard side of the brake system.

FIG. 2B is a close-up view of one possible design of the movable attachment 50 illustrated in FIG. 2A. The movable link 44 is attached to a pressure plate 26 of a brake pad via an attachment device 56 in such manner that as the inboard brake pad 20 moves, the movable link 44 slips through the attachment device 56. The attachment device 56 is designed to create a link force $L_F$ along the direction of movement that is indicated by the arrows NB.

Figure 3A:
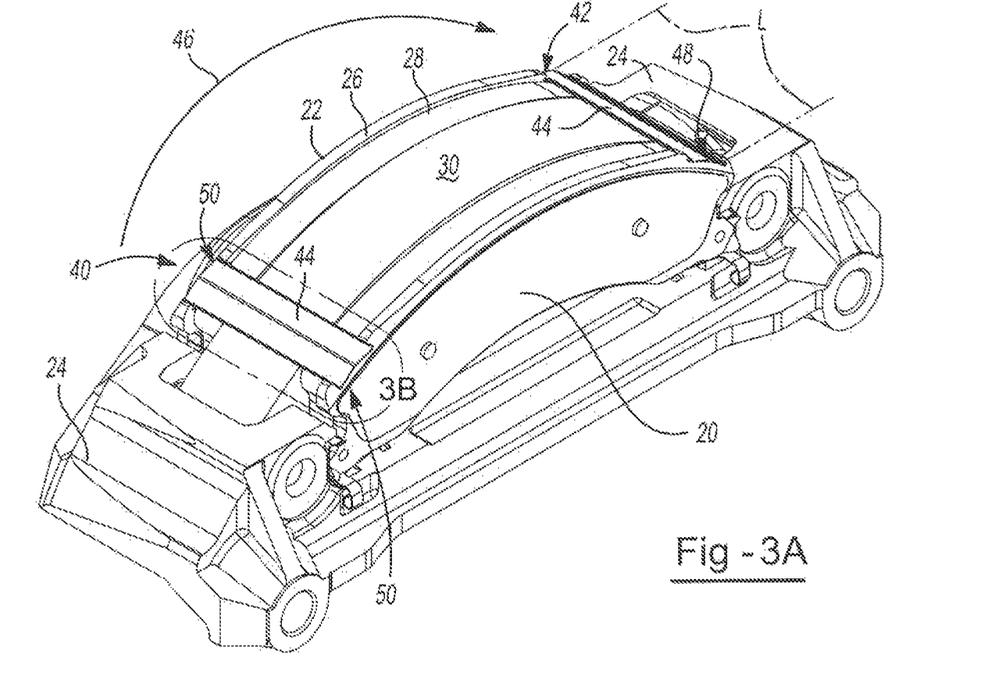
FIG. 3A illustrates another example of a brake system including another possible movable link configuration of the teachings herein.

FIG. 3A illustrates a perspective view of a support bracket 24, an inboard brake pad 20, an outboard brake pad 22, and a rotor 30 with the direction of rotation of the rotor 30 indicated by the arrow 46. The inboard brake pad 20 and the outboard brake pad 22 are coupled together via another possible configuration of a movable link 44 of the teachings herein. FIG. 3A has a movable link 44 in the leading region 40 and a movable link 44 in the trailing region 42. The movable links 44 form a fixed attachment 50 with a pressure plate 26 of the outboard brake pad 22, extend over the rotor 30 and the friction material 28 of the respective brake pads, and form a movable attachment 48 with a pressure plate 26 of the inboard brake pad 20. The movable link 44 has a length (L) measured from an end of the movable link on the outboard side to an end of the movable link on the inboard side of the brake system.

Figure 3B:
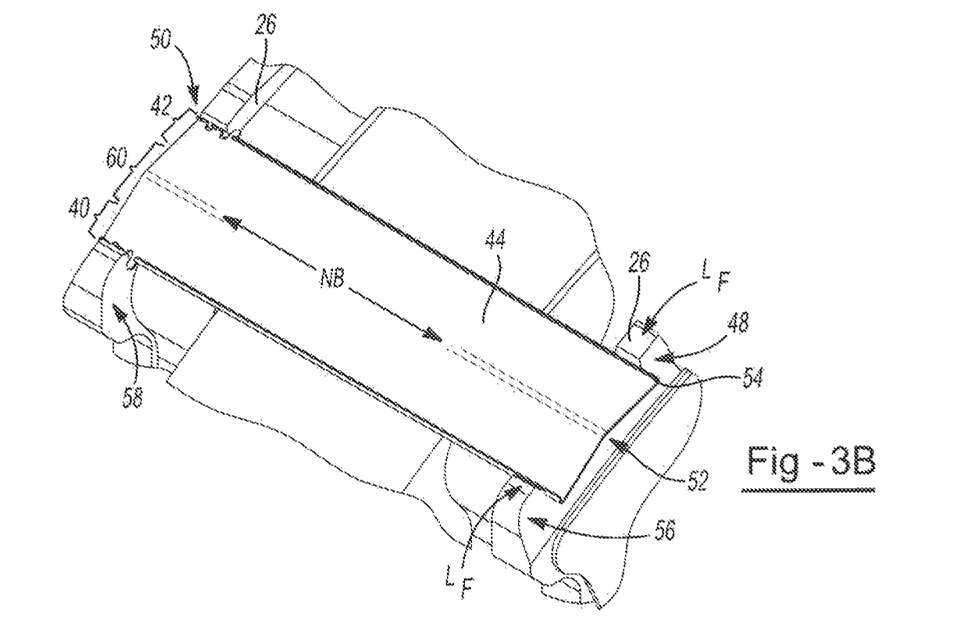
FIG. 3B is a close-up view of the movable link of FIG. 3A.

FIG. 3B is a close-up view of the attachments to the pressure plates 26 of the respective brake pads. As illustrated a movable attachment 48 and a fixed attachment 50 are shown. The movable link 44 includes a bend 52 in a central region 60 and attachment bends 54 along its full length (L). The movable link 44 snaps into a movably attachment device 56 of the pressure plates 26 to couple the inboard pad 20 and outboard pad 22, and snaps into a fixed attachment device 58 of the pressure plates 26. The bend 52 in movable link 44 is designed to allow the movable link 44 material to deflect into attachment features 56 to create a link force $L_F$ along the direction of movement that is indicated by the arrows NB.

Figure 4:
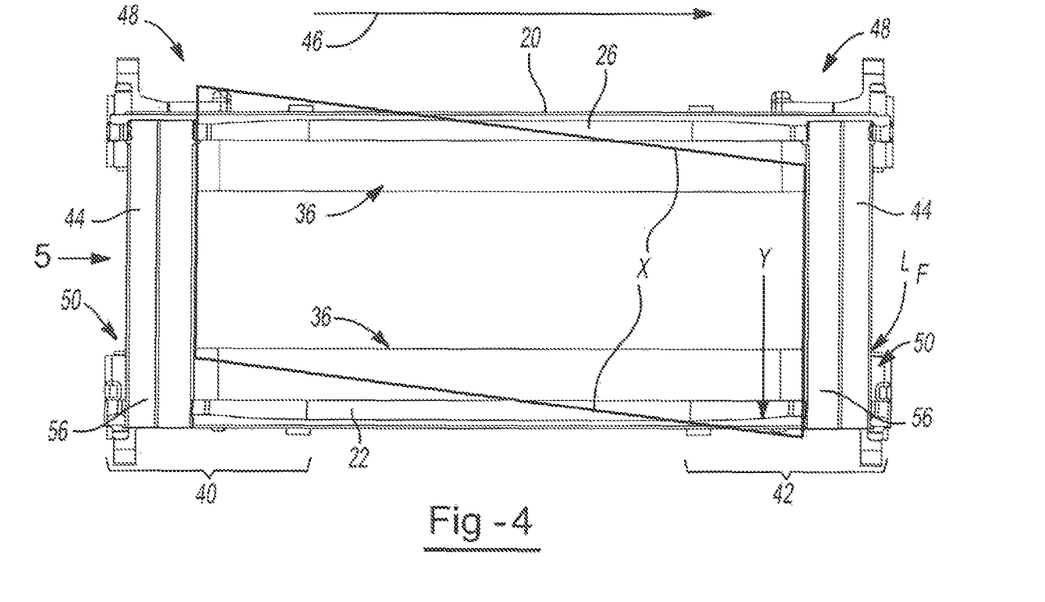
FIG. 4 illustrates one possible point of attachment of the movable link and movers of the brake pads.
Figure 5:
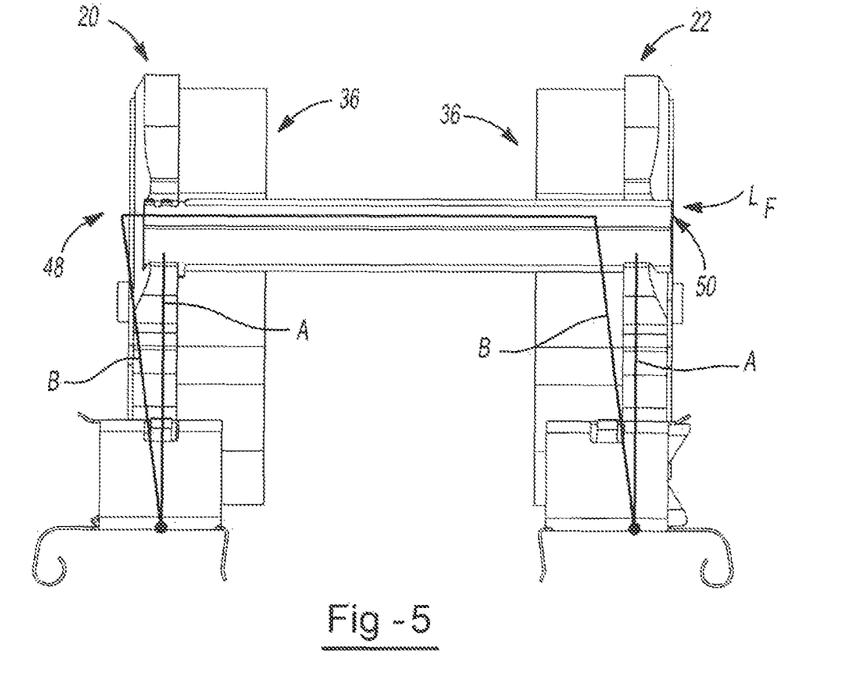
FIG. 5 illustrates another possible point of attachment of the movable links and movement of the brake pads.

FIG. 4 illustrate a top view of two opposing brake pads that are coupled together. The inboard brake pad 20 is coupled to the outboard brake pad 22 via a pair of movable links 44. One movable link 44 is located in a leading region 40 and one movable link is located in the trailing region 42 relative to the direction of rotation 46 of the rotor (not shown). The movable links 44 form a fixed attachment 48 with a pressure plate 26 of the inboard brake pad 20 and a movable attachment 50 with a pressure plate 26 of the outboard brake pad 22. Lines (X) illustrate that when one brake pad is moved in a direction (Y) the opposing brake pad is pushed and/or pulled in the same direction so that the faces 36 of the opposing brake pads remain substantially parallel. The movable links 44 will maintain the distance between the brake pad unless the force applied to one or both of the brake pads is sufficient to overcome the link force $L_F$ between the movable link 44 and the attachment device 56. As illustrated, the force being applied to one brake pad is not sufficient to overcome the Link force $L_F$ and the brake pad moved in unison by a force being applied to one brake pad FIG. 5 illustrates a plan view along the arrow labeled (FIG. 5) in FIG. 4. FIG. 5 shows of a pair of opposing brake pads viewing the brake pads from the ends of the brake pads. The inboard brake pad 20 includes fixed attachments 48 on either end of the brake pad located proximate to either ear of the inboard brake pad 20. The outboard brake pad 22 includes a movable attachment 50 on the end of either brake pad located proximate to either ear of the outboard brake pad 22. As illustrated by the lines (A) and (B) the movable link 44 maintains the brake pads is a parallel relationship via a link force $L_F$. As illustrated, as one brake pads moves from position (A) to position (B) the opposing brake pad pushes and/or pulls the opposing brake pad in the same direction, thus, maintaining the faces 36 of the respective brake pads in a substantially parallel relationship.

Figure 6:
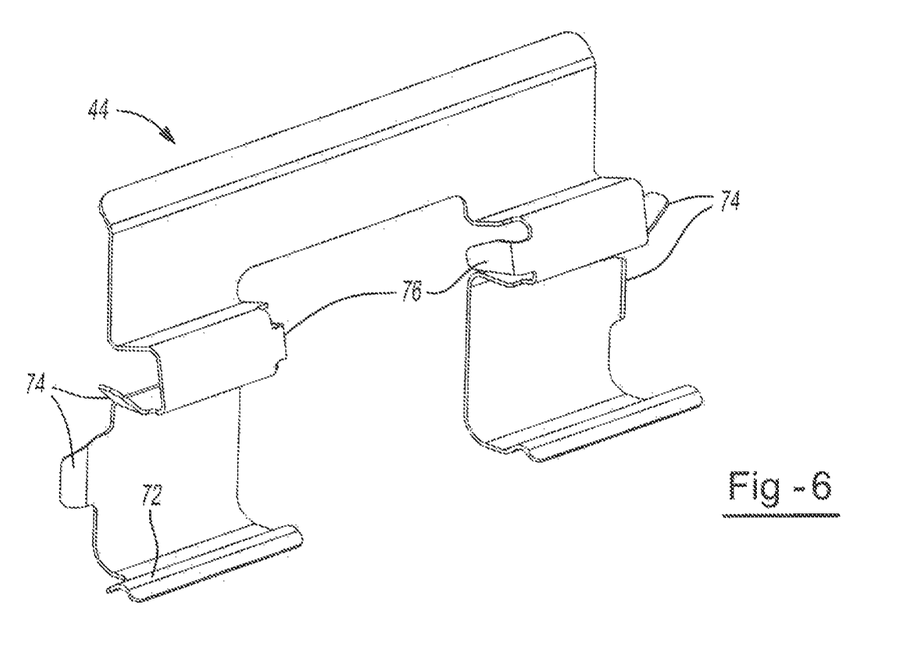
FIG. 6 illustrates a perspective view of one possible movable link.

FIG. 6 illustrates a perspective view of one possible embodiment of a movable link 44. The link includes pad stops 72 for receiving the ears of brake pads 20, 22 (not shown). The movable link 44 further includes locators 74 that assist when inserting brake pad ears during the caliper assembly process. Internal locators 76 are located on the inside of the movable link 44 and have the dual function to assist during the installation of the movable link onto a support bracket 70 (not shown) as well as for preventing the movable link from being moved into contact with a rotor 30 (not shown).

Figure 7:
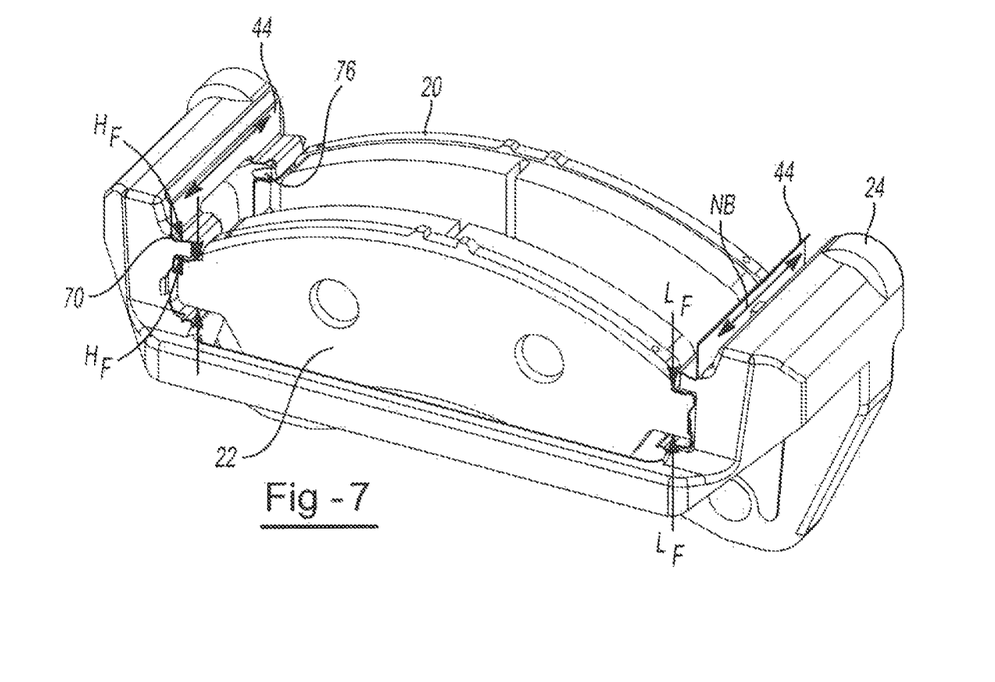
FIG. 7 illustrates an example of a support bracket and brake pads including one possible movable link configuration of the teachings herein.

FIG. 7 illustrates a perspective view of support bracket 24, having an inboard brake pad 20 and an outboard brake pad 24. The opposing sides of the support bracket 24 include a movable link 44. The movable links 44 are secured to an attachment feature 70 of the support bracket 24 by a holding force $H_F$ of the movable links 44. The links each secure an ear 34 of a brake pad by a link force 4, which holds the ear 34 of the brake pad within the movable link 44. During a non-brake apply, an application of force to one of the brake pads 20, 22 will overcome the holding force $H_F$ before the link force $L_F$ securing the ears of the brake pad so that the movable link 44 and brake pads 20, 22 are moved in the direction of the arrow (NB) and the movable link moves the brake pads 20 and 22 in unison. The movable links 44 include an internal locator 76 which locates onto the attachment feature 70 during a brake apply, preventing the movable links 44 from being moved into contact with a rotor 30 (not shown).

Figure 8:
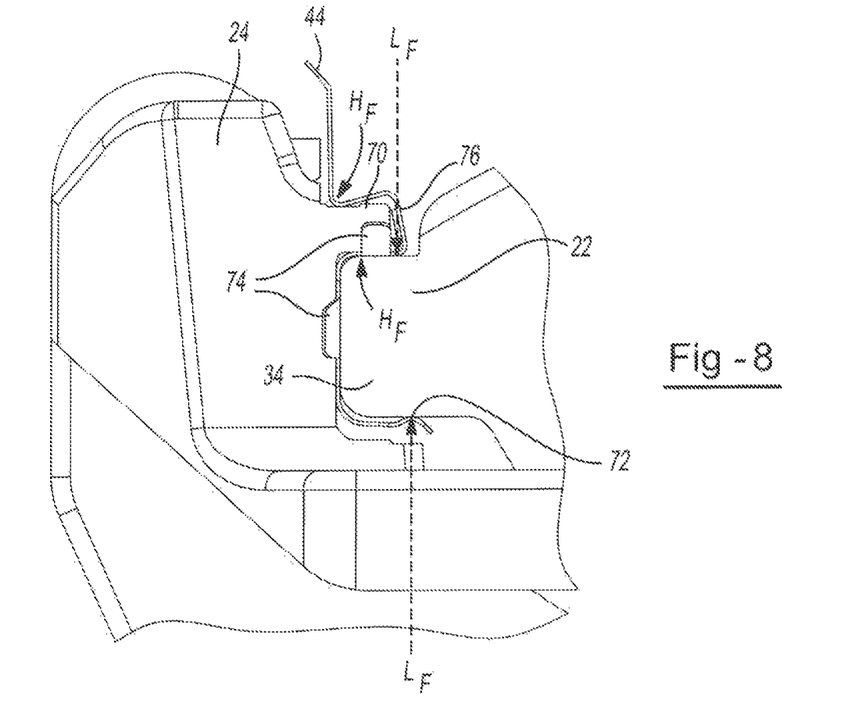
FIG. 8 illustrates a side view of the movable link of FIG. 6.

FIG. 8 illustrates a side view of the movable link 44 attached to an attachment feature 70 on the outboard side of the subpart bracket 24 and attached to an ear 34 of a brake pad 22. The movable link 44 as shown is applying a holding force $H_F$ on the attachment feature 70 so that the clip is attached to the support bracket 24. The movable link 44 as show is attached to one ear 34 of a brake pad 22 and the movable link 44 is applying a link force $L_F$ on the ear 34 so that the ear 34 is retained with in the movable link 44. The link force $L_F$ on the ear 34 is greater than the holding force $H_F$ on the attachment feature 70 so that the movable link 44 and both brake pads 20, 22 slide together before the brake pads 20, 22 are moved individually. The movable link 44 includes a link spring 72 for generating the link force $L_F$. The movable link 44 as illustrated includes two external guides 74 located on the outside of the support bracket to assist during pad assembly. The movable link further includes an internal locator 76 to prevent an opposing side of the movable link from being pushed into an opposing side of a rotor (not shown).

Figure 9:
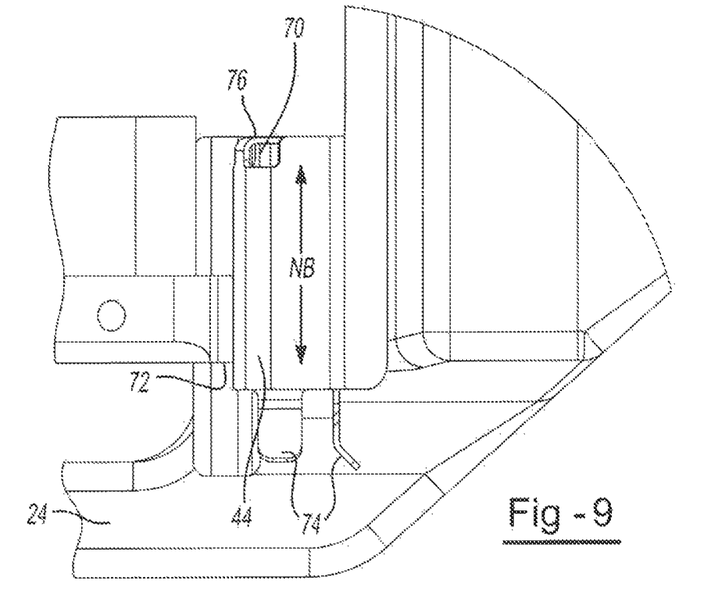
FIG. 9 illustrates a top view of the movable link of FIG. 6.

FIG. 9 illustrates a top view of the movable link 44 in connection with a brake pad 20, 22 and a support bracket 24. The movable link 44 as shown includes an internal locator 76 and another internal locator 76 (not shown) on the other side of the rotor (not shown) so that the movable link is prevented from moving too far in the direction (NB) to contact the rotor. The movable link 44 includes external guides 74 that assist during pad assembly. The ear 34 of the brake pad 20, 22 is in contact with a link spring 72 so that the brake pad 20, 22 is retained within the movable link 44.

Figure 10A:
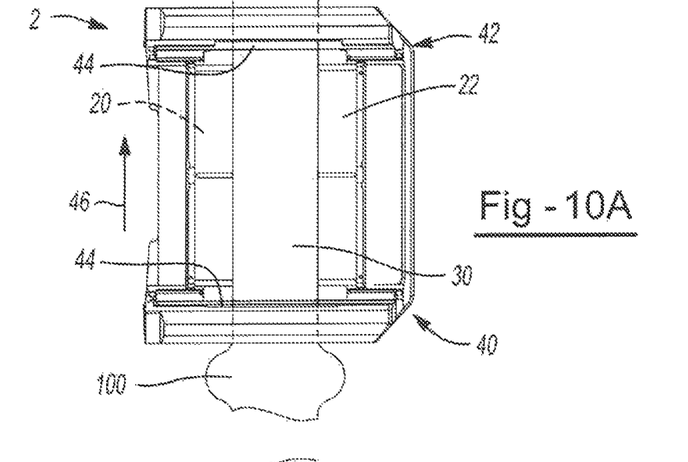
FIGS. 10A-C illustrate a sequence of movement of the brake pads during the first rotation of the rotor after a brake apply.
Figure 10B:
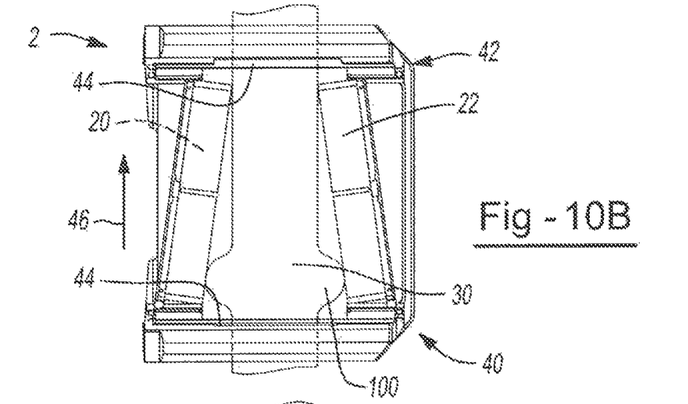
Figure 10C:
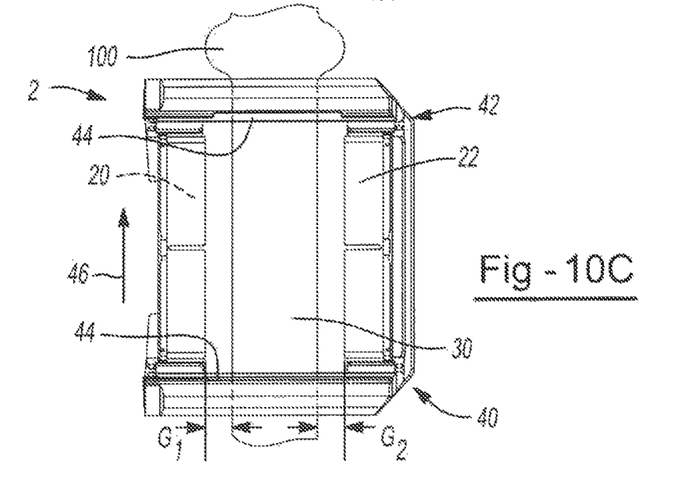

FIGS. 10A-10C illustrate top views of a sequence of movements of the brake pads during the first rotation of the rotor after a brake apply. The sequence is for illustrative purposes and the components of the brake system 2 may not be to scale. The rotor variation 100 is illustrated as being large for illustrative purposes and to demonstrate movement of the brake system components during rotation of the rotor 30 after a braking sequence.

FIG. 10A illustrates a brake system 2 after a brake apply and before a first full rotation of the rotor 30. The inboard brake pad 20 and the outboard brake pad 22 are in contact with opposing braking surfaces of the rotor the rotor 30 and are in communication with a movable link 44 on each end. After a brake apply the inboard brake pad 20 and the outboard brake pad 22 will remain substantially in contact with the rotor 30. The rotor 30 as illustrated has rotor variation 100 located proximate to the leading region 40. As illustrated the rotor 30 will rotate in the direction of rotation 46 so that the variation 100 will first enter the brake system 2 in the leading region 40 and exit the brake system 2 from the trailing region 42.

FIG. 10B illustrates the brake system 2 as the rotor 30 begins a first rotation after a brake apply. As illustrated, the rotor 30 and the rotor variation 100 rotate in the direction of rotation 46 so that the rotor variation 100 enters the leading region 40 and forces the inboard brake pad 20 and the outboard brake pad 22 to slide with respect to the movable link 44, moving the pads away from each other. The movable link 44 holds the ends of the inboard brake pad 20 and the outboard brake pad 22 with link forces $L_F$ (not shown) so that the ends of the brake pads in the trailing region 42 remain substantially in contact with the rotor 30.

FIG. 10C, illustrates the brake system as the rotor variation 100 of the rotor 30 exits the trailing region 42 of the brake system 2. As illustrated the rotor 30 has rotated in the direction of rotation 46 from the leading region 40 through the trailing region 42 so that the rotor variation 100 overcomes the link force of the movable link 44 holding the inboard brake pad 20 and the outboard brake pad 22 so that an air gap ($G_1$) on the inboard side and an air gap ($G_2$) on the outboard side of the rotor 30 are formed.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90 preferably from 20 to 80, more preferably from 30 to 70, it is intended that values such, as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A device comprising:
   one or more movable links adjacent to and spanning between two opposing brake pads along an axis,
   wherein the one or more movable links connect the two opposing brake pads so that the brake pads remain in a substantially parallel relationship as the two opposing brake pads and the one or more moveable links move together along the axis when one of the two opposing brake pads are contacted by a rotor during a free running condition after a first rotation of the rotor after a brake apply, and
   wherein dimensions of the one or more movable links remain constant during the brake apply, a brake retract, the free running condition, and a time therebetween.

2. The device of claim 1, wherein the one or more movable links are attached to and hold a support bracket with a holding force.

3. The device of claim 2, wherein the one or more movable links connect to an ear of a brake pad and the ear of the brake pad is held in the movable link by a link force.

4. The device of claim 3, wherein the link force is larger than the hold force so that during the free running condition any contact between the two or more brake pads and a rotor is sufficient to overcome the hold force but not sufficient to overcome the link force so that the two opposing brake pads and one or more movable links move in unison.

5. The device of claim 2, wherein one of the one or more movable links is a trailing link located in a trailing region and one of the one or more movable links is a leading link located in a leading region, and wherein the leading link and the trailing link attach the two or more opposing brake pads.

6. The device of claim 5, wherein the leading link and the trailing link are connected to the two opposing brake pads so that a face of each of the two opposing brake pads are maintained substantially parallel to each other and disc thickness variation, brake torque variation, or both are maintained and/or substantially reduced.

7. The device of claim 6, wherein the leading link, the trailing link, or both maintain the face of each of the two opposing brake pads so that the face of each of the two opposing brake pads are maintained substantially parallel to each other in a lateral direction, radial direction, longitudinal direction, tangential direction, or a combination thereof at all times.

8. The device of claim 5, wherein the leading link, the trailing link, or both extend over the rotor and attach the two opposing brake pads to each other; attach to abutment portions of the two opposing brake pads on the ends; or both.

9. The device of claim 5, wherein movement of one of the two opposing brake pads affects movement of the second one of the two opposing brake pads via the leading link, the trailing link, or both.

10. The device of claim 5, wherein during the free running condition the leading link, the trailing link, or both are attached so that any rotor variation moves one of the two opposing brake pads in a direction of the rotor variation and the leading link, the trailing link, or both moves the second one of the two opposing brake pads in the direction of the rotor variation so that the two opposing brake pads move in unison with the rotor variation.

11. The device of claim 5, wherein after a brake apply an air gap is created by rotor variation of a rotor which, upon entering between the at least two opposing brake pads forces the two opposing brake pads apart and creates the air gap so that the air gap is substantially equivalent in size to the rotor variation.

12. The device of claim 5, wherein the leading link, the trailing link, or both are fixedly attached to a pressure plate of one the two opposing brake pads.

13. The device of claim 5, wherein the leading link, the trailing link, or both are made of a unitary sheet of material.

14. The device of claim 13, wherein the unitary sheet of material includes a forward end region, a rearward end region, and a central region and each region includes at least one bend, crease, fold, or a combination thereof.

15. The device of claim 5, wherein the leading link, the trailing link, or both are fixedly attached to an inboard brake pad and movingly attached to an outboard brake pad.

16. The device of claim 15, wherein the leading link, the trailing link. or both require a force of between about 5 N and about 25 N to overcome the link force of the leading link, the trailing link, or both of the movable link so that the two opposing brake pads move independent of each other during a brake apply, a brake retract, or both.

17. The device of claim 1, wherein the one or more movable links are fixedly attached to one of the two opposing brake pads and movably attached to an opposing brake pad.

18. The device of claim 1, wherein the one or more movable links are substantially free of springing ability in a direction of movement of the two opposing brake pads, along the axis, or both.

19. A brake system comprising :
  a. a rotor;
  b. an inboard brake pad on an inboard side of the rotor;
  c. an outboard brake pad on an outboard side of the rotor;
  d. a leading link spanning between a forward region of the outboard brake pad and a forward region of the inboard brake pad; and
  e. a trailing link spanning between a rearward region of the outboard brake pad and a rearward region of the inboard brake pad;
  wherein the leading link and the trailing link are attached by a movable attachment to the inboard brake pad, the outboard brake pad, or both;
  wherein the movable attachment holds the leading link and the trailing link with a holding force so that during a free running condition after a first rotation of the rotor after a brake apply a face of the inboard brake pad and a face of the outboard brake pad are maintained in a substantially parallel relationship and during the brake apply a force applied to the two opposing brake pads is sufficient to overcome the holding force so that the two opposing brake pads move independent of each other,
  wherein the leading link, the trailing link or both move together with the inboard brake pad and the outboard brake pad when one of the inboard brake pad and the outboard brake pad are contacted by the rotor during the free running condition, and
  wherein dimensions of the leading link, the trailing link, or both remain constant during the brake apply, a brake retract, the free running condition, and a time there between.

20. The brake system of claim 19, wherein the leading link, the trailing link, or both move together with the inboard brake pad and the outboard brake pad relative to a support bracket when one of the inboard brake pad and the outboard brake pad are contacted by the rotor during the free running condition.

* * * * *

UNITED STATES PATENT AND TRADEMARK OFFICE
CERTIFICATE OF CORRECTION

PATENT NO. : 9,062,729 B2  
APPLICATION NO. : 13/669828  
DATED : June 23, 2015  
INVENTOR(S) : Galus Chelaidite

Page 1 of 1

It is certified that error appears in the above-identified patent and that said Letters Patent is hereby corrected as shown below:

Claims

Column 15, line 35, Claim 16 "link." should be "link,"

Signed and Sealed this
Twenty-seventh Day of October, 2015

Michelle K. Lee
*Director of the United States Patent and Trademark Office*